United States Patent [19]
Campbell et al.

[11] Patent Number: 6,156,415
[45] Date of Patent: Dec. 5, 2000

[54] METHOD FOR FABRICATING A MULTILAYER OPTICAL ARTICLE AND A SYSTEM HAVING A MULTILAYER OPTICAL ARTICLE

[75] Inventors: Scott Patrick Campbell, Chatham; Alexander Lowe Harris, Maplewood; Nicholas James Levinos, Hampton, all of N.J.

[73] Assignee: Lucent Technologies Inc., Murray Hill, N.J.

[21] Appl. No.: 09/248,145

[22] Filed: Feb. 10, 1999

Related U.S. Application Data

[62] Division of application No. 08/867,563, Jun. 2, 1997, Pat. No. 5,932,045.

[51] Int. Cl.$^7$ .............................. B32B 7/02; G11B 7/0065
[52] U.S. Cl. ...................... 428/212; 428/141; 428/213; 428/333; 428/913; 359/1; 359/3; 359/6; 430/2
[58] Field of Search ...................................... 428/141, 213, 428/212, 333, 913; 359/1, 3, 6; 430/2

[56] References Cited

U.S. PATENT DOCUMENTS

| | | | |
|---|---|---|---|
| 4,537,827 | 8/1985 | Little et al. | 428/409 |
| 5,433,911 | 7/1995 | Ozimek et al. | 264/261 |
| 5,515,167 | 5/1996 | Ledger et al. | 356/357 |

*Primary Examiner*—William P. Watkins, III
*Attorney, Agent, or Firm*—Scott J. Rittman

[57] ABSTRACT

A method for fabricating an article, comprising the steps of grasping an outer surface of a first substrate with a first holder, whereby the outer surface of the first substrate is held to an inner surface of the first holder; grasping an outer surface of a second substrate with a second holder, whereby the outer surface of the second substrate is held to an inner surface of the second holder; arranging the inner surfaces of the first and second holders to face one another in a selected angular relationship; disposing an adherent on one or more surfaces selected from an inner surface of the first substrate and an inner of the second substrate; moving the first and second holders toward each other such that the inner surfaces of the first and second substrates contact the adherent; and at least partially curing the adherent while the inner surfaces of the first and second holders are in the selected angular relationship to form a multilayer article, wherein after removal of the first and second holders the at least partially cured adherent maintains the multilayer article in a posture at which the multilayer article was held by the first and second holders; and a system comprising a multilayer article that comprises a substrate and a layer of at least partially cured adherent adhered to the substrate, wherein the memory cell has surface flatness and transmission flatness values of about 0.05 to about 0.25 waves/cm, and wherein the force exerted by the adherent on the substrate maintains the flatness.

9 Claims, 10 Drawing Sheets

METHOD FOR FABRICATING A MULTILAYER OPTICAL ARTICLE AND A SYSTEM HAVING A MULTILAYER OPTICAL ARTICLE

This is a divisional of application Ser. No. 08/867,563, filed on Jun. 2, 1997 now U.S. Pat. No. 5,932,045.

BACKGROUND OF THE INVENTION

1. Field of the Invention

The present invention relates to a method for improving the optical properties of a substrate and for making multilayer optical articles, e.g. optically flat articles.

2. Discussion of the Related Art

Many optical systems require devices having specific optical properties, in particular, surface flatness, thickness uniformity, and/or bow. Surface flatness of an article is determined by measuring the variation of the article's surface from a specified surface profile (the profile, for example, may have a certain bow). The thickness uniformity is measured by the article's variation from a specified thickness or profile (e.g., parallel or wedge-shaped). Both of these parameters are typically measured in units of optical waves of variation from the specified profile per transverse distance, e.g., waves/cm, where the wave is a specified wavelength, e.g., of the particular light being used for measurement or for the ultimate use. When used herein, units of waves/cm indicate an average measurement over the area of the article intended to have the desired optical characteristics. Bow is a physical measurement, determined as shown by FIG. 1. The distances B from the center of an article to a line drawn between two contact points where a plane meets the article is divided by half of the distance Y of that line. The units (e.g., B cm/(Y/2)cm) divide out to give a unitless value.

For optics applications, where one is concerned with the effect of an article on light passing through that article, physical thickness uniformity is typically not relied upon. Instead, a transmission flatness is determined by measuring the deviation of the optical path length (discussed below) from the preselected profile, and FIG. 2 shows this measurement for a configuration desired to have a uniform thickness (i.e., parallel surfaces). Transmission flatness is also presented in waves/cm, and, as known to those in the art, transmission flatness may also be expressed in rms (root mean squared) waves/cm or by the Strehl value, as discussed in J. W. Goodman, *Introduction to Fourier Optics*, McGraw-Hill, 1968. FIG. 2 shows two paths through a multilayer article, the paths located a distance z from each other transversely across the article. The physical path length difference across distance z is $|1'-1|$, and the variation from exact thickness uniformity is $|1'-1|/z$, which is typically measured in $\mu m/cm$. The physical path length is not affected by, nor does it take into account, the refractive indices of the individual layers 10, 12, and 14, or the wavelength of the light being used.

Optical path length (OPL) is the relevant parameter for transmission flatness and is represented by the following formula:

$$OPL = \sum_j n_j L_j,$$

$n_j$ is the refractive index of layer j and
$L_j$ is the physical path length through layer j.

In contrast to physical path length, the OPL depends on the refractive index. For example, in a multilayer article such as that of FIG. 2, the OPL depends on the refractive indices of layers 10, 12, and 14. Specifically, the OPL difference ($\Delta OPL$) across the article of FIG. 2 is equal to:

$$|(n_{10}L_{10}+n_{12}L_{12}+n_{14}L_{14})-(n_{10}L'_{10}+n_{12}L'_{12}+n_{14}L'_{14})|.$$

This equation shows that where the goal is a small OPL difference, if the substrates have relatively large individual thickness variations, but the overall thickness variation is relatively small, it is useful for the refractive indices of the substrates to be close. As reflected in FIG. 2, the transmission flatness, assuming a parallel configuration is desired, is therefore $\Delta OPL/z$. For optics applications, it is clear that the variation from a selected profile in OPL is more meaningful than the change in physical path length per transverse unit.

Transmission and surface flatness values are presented in waves/cm, where the value given is for a specified wavelength. Use of such waves/cm herein indicates that the value is for the optical path length as opposed to the physical path length. For purposes of the present application, values in waves/cm are useful at least for wavelengths ranging from about 0.4 to about 0.7 $\mu m$, but the concept of the invention extends beyond this range.

For substrates typically used in optics applications, there are three basic types of thickness variations that affect surface and transmission flatness. The first type is a linear thickness change from low to high over the surface of the substrate, whereby the substrate essentially takes the form of a wedge. The thickness variation of such a substrate per unit length is relatively constant. The second type of a variation is a gradual, wavy, or random, variation, where the thickness varies, for example, from low to high to low to high gradually across the width of the substrate. The thickness variation of such a substrate per unit length is relatively constant, but the substrate does not take the form of a wedge. The third type of variation is localized, sharp divots or peaks. Such divots or peaks typically cause rapid variations in thickness measurements taken at different locations along a substrate and may therefore skew an rms measurement. Structures having this third type of variation are typically measured in terms of scratch and dig, as known in the art. Clearly, these characteristics often cause numerous difficulties when attempting to form structures with combinations of low surface smoothness variations, low thickness uniformity variations, and/or low bow.

Articles used in precise applications desirably have a surface and transmission flatness of 0.1 waves/cm or better. Articles for transmission applications where parallel surfaces are desired desirably have a bow of $10^{-2}$ or less (less meaning numerically smaller), and articles for reflection applications where parallel surfaces are desired desirably have a bow of $10^{-5}$ or less. It is difficult to prepare or obtain substrates or multilayer articles having such properties. High quality glass intended for flat panel displays (referred to herein as display glass), for example, will have surface and transmission flatness values ranging from about 0.25 to about 4 waves/cm. To obtain better, and more consistent flatness values, it is necessary to obtain a thick piece of glass and polish the glass to a desired flatness. Such chemical/mechanical polishing, however, is expensive and time-consuming, and may still be inadequate for preparing substrates and articles having the above properties. Easier and less expensive methods for improving the optical flatness of substrates and for forming optical articles, e.g., articles having certain bow, thickness uniformity, and surface flatness, are desired.

SUMMARY OF THE INVENTION

The invention provides a relatively easy and inexpensive method, compared to conventional processes, for forming a variety of articles having excellent optical properties, e.g., surface flatness, transmission flatness, and/or bow. In one embodiment, the method of the invention comprises the steps of grasping an outer surface of a first substrate with a first holder having a preselected, optically desirable shape and/or surface, whereby the outer surface of the substrate is held to an inner surface of the holder; grasping an outer surface of a second substrate with a second holder having a preselected, optically desirable shape and/or surface, whereby the outer surface of the substrate is held to an inner surface of the holder; disposing an adherent on an inner surface of one or both substrates; moving the substrates such that both contact the adherent in a selected angular relationship; and at least partially curing the adherent. After removal of the resulting multilayer article from the holders, the force exerted by the cured adherent on the substrates maintains the multilayer article in a posture, e.g., flatness and/or bow, in which the substrates were held by the holders. To obtain these results, the inner surfaces of the holders comprise continuous surface portions to which the substrates substantially comply, and a posture is maintained in the substrates over the area covered by these continuous surface portions.

In another embodiment of the invention, the method comprises the steps of grasping an outer surface of a single substrate with a holder having a preselected, optically desirable shape and/or surface, whereby the outer surface of the substrate is held to an inner surface of the holder; disposing an adherent on an inner surface of the substrate; and at least partially curing the adherent. After removal of the substrate from the holder, the force exerted by the cured adherent provides the substrate with a certain posture, e.g., flatness, based on the effect of the adherent and the posture in which the substrate was held by the holder. The bow imparted by the holder is difficult to maintain in such configurations due to shrinkage stresses exhibited by typical adherents. It is possible to use such shrinkage stresses to provided a certain bow to the substrate, but the numerous variables involved make attainment of the desired bow difficult. Again, the inner surface of the holder must contain a continuous surface portion, over which the effect of the adherent is seen.

The method is useful for fabricating articles that require precise flatness and/or bow. Such flatness and/or bow is attained by selecting a certain configuration, e.g., one substrate vs. two, an adherent that shrinks a relatively large amount, a relatively small amount, or not at all, and a selected angular relationship. In addition, it is possible for the adherent to act as both an adherent and a photosensitive recording material. The invention also relates to a system comprising a multilayer article that comprises one or two substrates and a layer of at least partially cured adherent adhered to the substrate or substrates. The force exerted by the adherent maintains the surface flatness, transmission flatness, and/or bow of the substrate or substrates, depending on the particular configuration and the needs of the system. The article advantageously has surface and transmission flatness values of about 0.05 to about 0.25 waves/cm, and also advantageously a bow of about $10^{-2}$ or less.

BRIEF DESCRIPTION OF THE DRAWINGS

FIG. 3b shows a cross-sectional side view, along line a-a', of the holder of FIG. 3a.

FIG. 4b shows a cross-sectional side view, along line b-b', of the holder of FIG. 4a.

Figure 1:
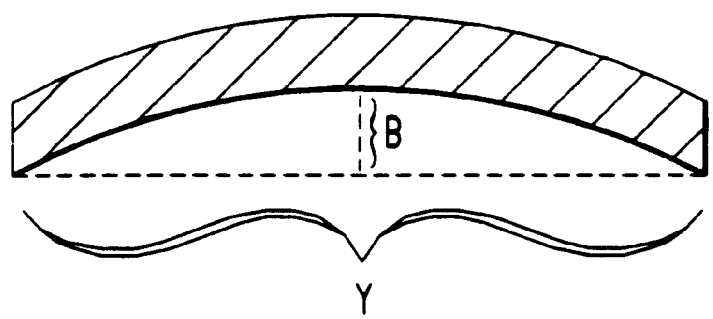
FIG. 1 illustrates bow in an article.
Figure 2:
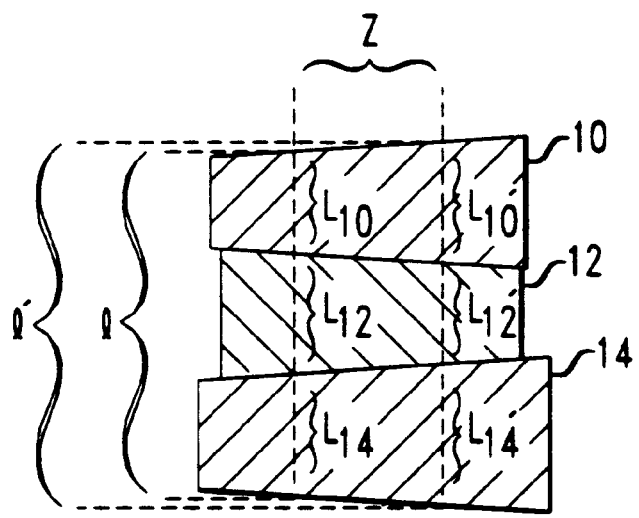
FIG. 2 illustrates physical and optical path length through a multilayer article.

DETAILED DESCRIPTION OF THE INVENTION the invention relates to a method for fabricating multilayer optical articles. In one embodiment, the method comprises the steps of:

grasping an outer surface of a first substrate with a first holder, whereby the outer surface of the first substrate is held to an inner surface of the first holder;

grasping an outer surface of a second substrate with a second holder, whereby the outer surface of the second substrate is held to an inner surface of the second holder;

arranging the inner surfaces of the first and second holders to face one another in a selected angular relationship;

disposing an adherent on the inner surface of the first substrate or the inner surface of the second substrate;

moving the first and second holders toward each other such that the inner surfaces of the first and second substrates contact the adherent; and at least partially curing the adherent while the inner surfaces of the first and second holders are in the selected angular relationship to form a multilayer article.

After removal of the first and second holders, the at least partially cured adherent maintains the multilayer articles in a posture at which it was held by the first and second holders. Posture means the surface flatness, the transmission flatness, and/or the bow of an article. At least one, possibly all three, of these properties will be maintained by the adherent upon removal of the article from the holder. However, the particular properties maintained, and the degree to which they are maintained, depend on, among other things, the particular configuration, substrate material, and adherent. Where two substrates are used, it is possible for the surface flatness, transmission flatness, and bow to all be maintained by the adherent upon removal from the holders.

In another embodiment, the method comprises the steps of:

grasping an outer surface of a substrate with a holder, whereby the outer surface of the substrate is held to an inner surface of the holder;

disposing an adherent on an inner surface of the substrate; and at least partially curing the adherent to form a multilayer article.

After removal of the holder, the force of the at least partially cured adherent provides a certain posture to the substrate, e.g., flatness or bow. With one substrate it is difficult to maintain the bow imparted by the holder, even with a tightly-bonding adherent, e.g., the substrate will tend to move toward its original bow after removal from the holder. It is possible for such a change in bow to also be caused by adherent that shrinks during cure. For example, it is possible for the adherent to maintain the surface and transmission flatness of a single substrate upon removal from the holder, but shrinkage forces in the adherent layer will tend to induce a bow upon removal. It is possible to use this effect beneficially, as reflected in Example 3 below. A uniform layer of adherent is useful in reducing the variables of the process, and in providing a more uniform bow. To obtain a uniform layer of adherent, it is possible to bring an article matching the shape of the holder into contact with the adherent (the article is removed before the cure) to press the adherent into a uniform layer. It is also possible to use a doctor blade-type apparatus to obtain such a uniform layer of adherent.

Different factors are involved in production of one-substrate articles versus two-substrate articles. For example, it is possible for two-substrate articles to compensate for shrinkage stresses commonly encountered with curable adherents and thereby maintain the bow imparted by the holders. However, as stated above, it is difficult for a one-substrate article to maintain the bow of the holder, due to the stresses imparted on the substrate by an adherent that shrinks during cure.

To maintain the surface flatness, transmission flatness, and/or bow, the inner surface of the holder or holders must comprise a continuous surface portion to which at least a portion of the substrate substantially conforms. As used herein, the term holder is intended to define an article comprising, among other things, such a continuous surface portion. The continuous surface portion does not have a discontinuity that would allow for non-conformance of the substrate. (It is possible for the continuous surface portion to have relatively small discontinuities, e.g., small holes, as long as the discontinuities do not allow for such non-conformance.) It is possible for the continuous surface portion to be bounded by an area where a grasping force is applied, e.g., a vacuum groove (such as in FIGS. 3a and 3b), or for the grasping force to be applied at more than one area around and/or within the continuous surface portion, e.g., several vacuum grooves (such as in FIGS. 4a and 4b) or several vacuum holes. It is also possible for the grasping force to be applied through the entire continuous surface portion, e.g., by an electromagnetic material. It is over this continuous surface portion that the flatness and/or bow is maintained.

Figure 3A:
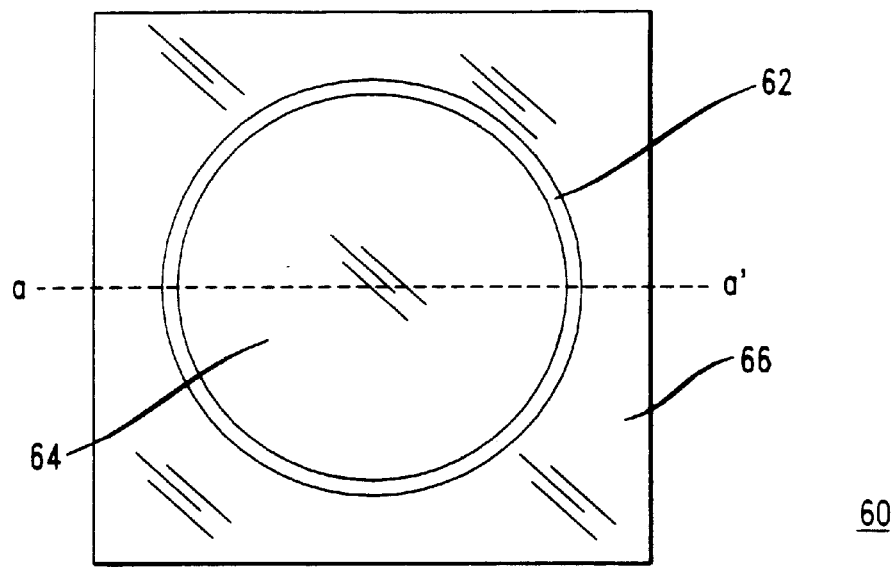
FIG. 3a shows the inner surface of a holder of one embodiment of the invention.
Figure 3B:
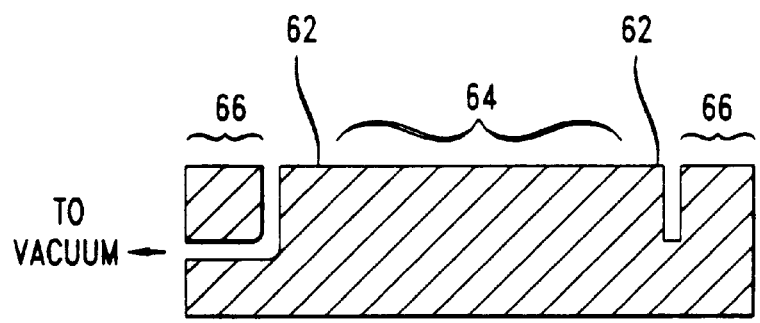

FIGS. 3a and 3b show a holder 60 suitable for use in the invention that contains such a continuous surface portion. (FIG. 3b is a cross-sectional side view along line a-a' of FIG. 3a.) The holder 60 contains a single vacuum groove 62 that is attached to a vacuum (not shown). The vacuum groove 62 bounds a continuous surface 64 to which a substrate will substantially conform upon application of the vacuum. Surface 66 of the holder 60 is outside the vacuum groove 62, and is not part of a continuous surface portion. A substrate would not be forced to substantially comply with the surface 66 upon application of a vacuum.

Figure 4A:
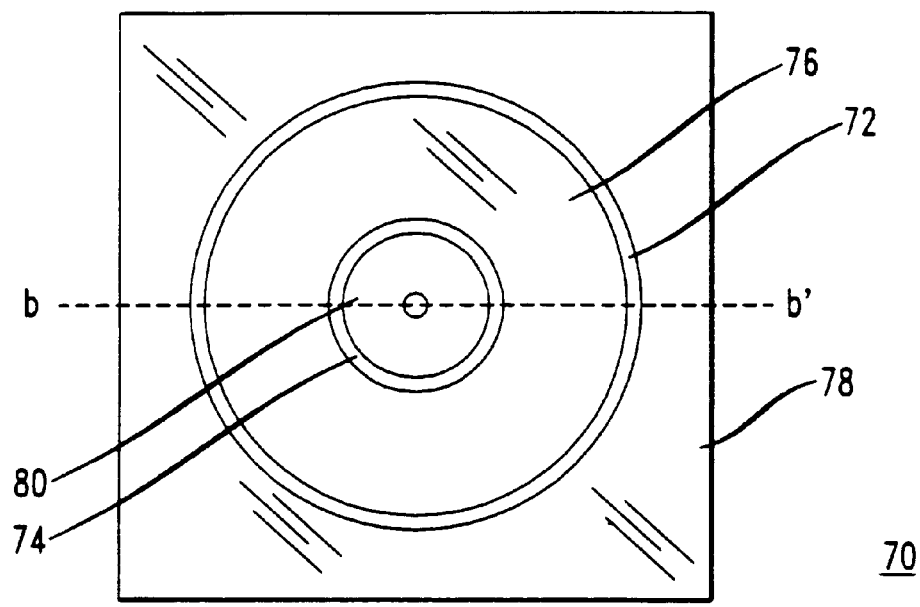
FIG. 4a shows the inner surface of a holder of another embodiment of the invention.
Figure 4B:
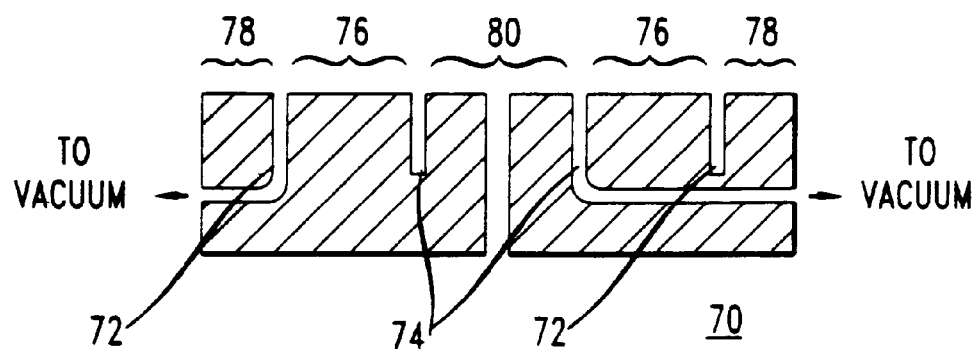

FIGS. 4a and 4b show another holder 70 suitable for use in the invention. (FIG. 4b is a cross-sectional side view along b-b' of FIG. 4a.) The holder 70 contains two vacuum grooves—an outer vacuum groove 72 and an inner vacuum groove 74. A continuous surface 76 lies between groove 72 and groove 74. Surface 78 (lying outside the outer vacuum groove 72) is not part of a continuous surface portion. Also, as shown in FIGS. 4a and 4b, it is possible for holder 70 to have a hole located at the area of surface 80, in which case surface 80 is also not part of a continuous surface portion.

In a case where the holder uses electromagnetic force to grasp a substrate, it is possible for the continuous surface portion to apply the force over its entirety, or for the continuous surface portion to have a particular area around its periphery, e.g., in the shape of a ring or a square, in which the force is applied. In the latter embodiment, the posture of the substrate will be maintained over and within the ring or square in which the force is applied.

In contrast to the holder embodiments above, a vacuum ring does not constitute a holder in accordance with the invention, because the vacuum groove of the ring does not bound a continuous surface portion—the gap in the middle of the ring provides a discontinuity that allows non-conformance of a substrate.

The inner surfaces of the holders of the invention have an optically desirable shape and/or surface. Advantageously, the inner surface of a holder has a surface flatness of about 0.05 to about 0.25 waves/cm. Also advantageously, the inner surface of a holder has a bow of about $10^{-2}$ or better, particularly for articles intended for transmission applications, whereas a bow of about $10^{-5}$ or better is advantageous for articles intended for reflective applications. It is possible for the steps of these embodiments to be performed in an order other than the order presented above.

Advantageously, the multilayer articles of the invention have surface flatness and transmission flatness values of about 0.05 to about 0.25 waves/cm, these numbers useful for at least wavelengths of about 0.4 to about 0.7 $\mu$m, although the concept of the invention extends beyond this range. Also advantageously, particularly where two substrates are used, the articles have a bow of about $10^{-2}$ or less, and more advantageously, about $10^{-5}$ or less (particularly for reflective applications). For the embodiment using only one substrate, the same surface flatness as above is advantageous, but transmission flatness will typically be of less concern, and will be more difficult to obtain than surface flatness. Also, as discussed above, it is difficult to obtain a low bow for single substrates.

In the case of two holders and two substrates, it is advantageous for the selected angular relationship between the inner surfaces of the holders to be a parallel relationship, meaning that the distance between the continuous surface portions of the inner surfaces of the two holders (optionally the whole of the inner surfaces) does not vary by more than about 1 wave/cm. A multilayer article having parallel substrates advantageously has surface flatness and transmission flatness values of about 0.05 to about 0.25 waves/cm, a Strehl value of 0.5 or greater (more advantageously 0.9 or greater) and a bow of about $10^{-2}$ or less (advantageously $10^{-5}$ or less for reflective applications).

The adherent is advantageously disposed in a continuous layer. The improved flatness and/or bow of the substrate or multilayer article is primarily attained in the area where the adherent contacts a substrate or substrates. The area of the adherent is typically within the area of the continuous surface portion of the holder or holders. Portions of the substrate or substrates that extend past the area of the adherent, and especially past the area of the continuous surface portion tend to return to their initial state after the holder or holders are removed. When flatness, Strehl value, and bow of a substrate or an article are discussed herein, the flatness, Strehl value, or bow referred to is of this area where the adherent maintains the flatness and/or bow of a substrate or the flatness and/or bow of a multilayer article.

Figure 6A:
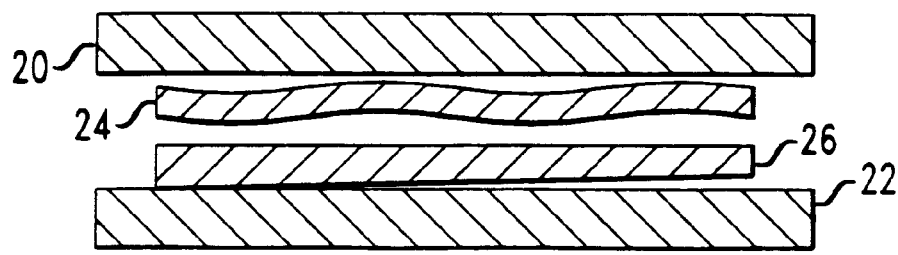
FIGS. 6a,b,c show steps in a further embodiment of the method of the invention.
Figure 6B:
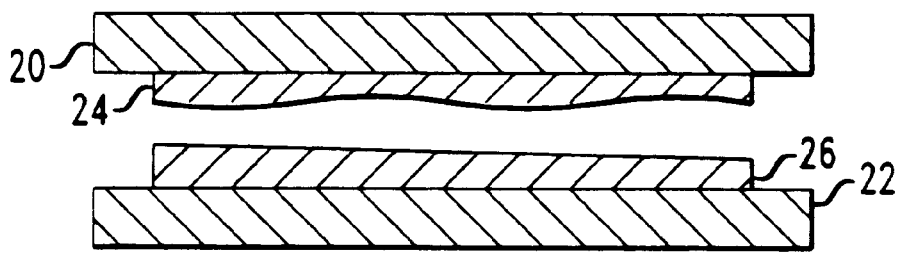
Figure 6C:
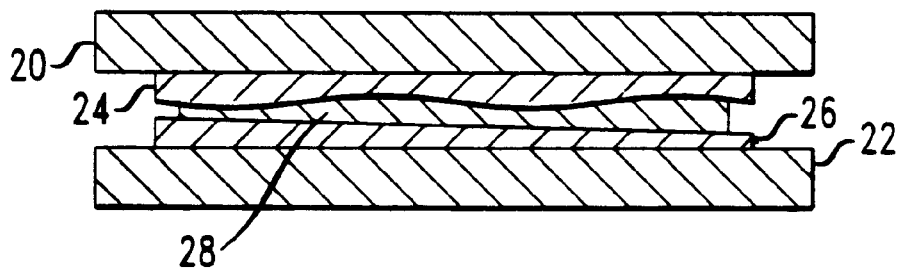

In accordance with an embodiment of the invention utilizing two substrates, as shown in FIG. 6a–6c, two holders 20, 22 having inner surfaces with relatively low bow are brought into a selected angular relationship (in this embodiment, a parallel relationship). For simplicity, the continuous surface portions of the inner surfaces of holders 20, 22 are not shown. It is possible, for example, for holder 20, 22 to have the configuration of FIGS. 3a and 3b or FIGS. 4a and 4b. In this embodiment, the two holders 20, 22 are arranged to allow them to be manipulated into a parallel relationship and moved toward each other. For example, it is possible for holder 22 to be attached to gimbals that rotate in pitch and yaw (i.e., about its x- and y-axes), and holder 20 to be attached to an apparatus above holder 22 such that holder 20 is fixed in the pitch-yaw (i.e., x-y) plane but is capable of movement along the z-axis. It is possible to use a Fizeau interferometric method, such as discussed in E. Hecht, *Optics*, Addison-Wesley Publishing, 1987, or a similar method known in the art, to measure the parallelism of the inner surfaces of the holders 20, 22 and allow for appropriate corrections. Such methods are also capable of measuring any selected angular relationships between holders.

Once the holders 20, 22 are arranged in the parallel relationship, substrates 24, 26 are placed onto the holders 20, 22, which hold the outer surfaces of the substrates 24, 26 by one of several methods discussed below. (In other embodiments of the invention, it is possible for the inner surfaces of the holders to be brought into a parallel relationship at later stages in the process, e.g., after the substrates 24, 26 are placed onto the holders 20, 22.) FIG. 6a shows the holders 20, 22 and substrates 24, 26 before the substrates 24, 26 are held to the surface of the holders 20, 22. Substrate 24 is shown with gradual, wavy thickness variations, and substrate 26 is shown with a wedge type variation.

As shown in FIG. 6b, a force or attraction causes the outer surfaces of the substrates 24, 26 to substantially comply to the continuous surface portions (not shown) of the holders 20, 22. It is possible for the outer surfaces of the substrates 24, 26 to be held by vacuum, by electrostatic or magnetic attraction, or by a temporary chemical bond such as an adhesive. In certain cases where a temporary bond or electrostatic attraction are used, such as where thin, flexible substrates are used, the substrates 24, 26 will have to be pressed upon the holder 20, 22 in a manner that provides compliance to the surfaces of the holders 20, 22. One such manner is the use of a roller. Once the outer surfaces of the substrates 24, 26 are held onto the inner surfaces of holders 20, 22, the Fizeau or similar method is able to confirm the parallelism of the inner surfaces of the holders 20, 22, if the substrates 24, 26 are of a transparent material that allows use of the method. For example, if the substrates 24, 26 are transparent and have an anti-reflective coating on the side contacting the holder, it is possible for a Fizeau method to be used successfully. As discussed above, the inner surfaces of holder 20,22 contain a continuous surface portion.

In accordance with this embodiment of the invention, with the substrates 24, 26 held in compliance with the flat surfaces of the holders 20, 22, an adherent 28 is applied to an inner surface of substrate 26. It is also possible to apply the adherent at an earlier stage in the process. Holder 20 brings the inner surface of substrate 24 into contact with the adherent 28 while the inner surfaces of the holders 20, 22 (and thus the outer surfaces of the first and second substrates 24, 26) are kept in the parallel relationship, as shown in FIG. 6c. The holders 20, 22 should press the substrates 24, 26 together with enough force to obtain a desired spread of adherent 28 between the substrates 24, 26 and/or obtain a desired level of contact between the adherent 28 and substrates 24, 26. It is useful to perform the Fizeau or similar method to confirm parallelism while the holders 20, 22 are grasping the substrates 24, 26 and pressing the substrates 24, 26 together with the adherent 28, and before curing the adherent 28.

The adherent 28 is then at least partially cured such that when the holders 20, 22 are removed, the rigidity or force exerted on the inner surfaces of the substrates 24, 26 by the adherent 28 maintains the substantially parallel relationship (i.e., the low bow) and the surface and transmission flatness imparted to the outer surfaces of the substrates 24, 26. The bow and flatness are maintained within the area of the continuous surface portions of the holders 24, 26, and primarily in the area contacted by the adherent 28, as discussed above. The forces involved in maintaining this relationship are discussed below.

For ease of discussion, the holders 20, 22 are described in this embodiment as separate holders. It is possible, however, for the holders to be two pieces of a single part.

In an embodiment of the invention using one substrate, as reflected in FIG. 5, the holder 30 has an inner surface with relatively small bow, and an outer surface of the substrate 32 is placed on an inner surface of the holder 30 and held there by a force or bond, as discussed fully below. Again, the continuous surface portion of the inner surface of holder 30 is not distinguished. An adherent 34 is disposed on the opposing (inner) surface of the substrate 32, and subsequently at least partially cured. As mentioned above, upon removal, it is possible for the flatness imparted by holder 30 on the outer surface of substrates 32 to be maintained, but the bow of the holder is more difficult to maintain. The bow may be altered, desirably or undesirably, by the adherent 34 shrinking or expanded during cure.

Figure 5:
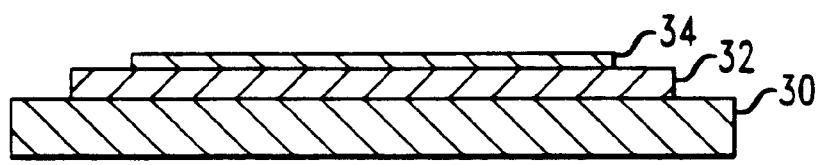
FIG. 5 shows a step in one embodiment of the method of the invention.

In an embodiment such as shown in FIG. 5, it is possible to produce an article having a desirable parabolic bow. Where an adherent is disposed in a circular pattern and in a uniform thickness (the thickness of the adherent layer not varying more than about 10%), and where the adherent shrinks during cure, it is possible to obtained such a parabolic bow due to uniform shrinkage stresses in the adherent layer. This result is reflected in Example 3 below. In optics applications, such parabolic shapes are typically preferred over spherical bows.

The method of the present invention is advantageously performed in a clean room environment. Among other things, a clean room helps prevent contaminants such as dust particles from lodging between the holders, substrates, and/or adherent. With thickness variations measured in wavelengths, it is apparent that even a single dust particle (typically having a diameter of 1 to 10 wavelengths) affects the flatness of the overall article.

The adherent is disposed onto the substrate or substrates by any suitable method, and is used in liquid or solid form. The adherent comprises any material that sufficiently adheres and/or provides rigidity to the substrate or substrates such that the upon removal of the holders the substrate or multilayer article is maintained in a posture at which it was held by the holder or holders.

Figure 7:
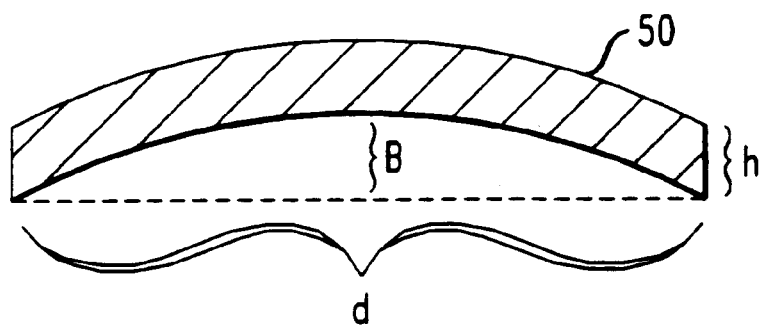
FIGS. 7 and 8 illustrate the forces required to maintain the optical characteristics of articles made according to the invention.
Figure 8:
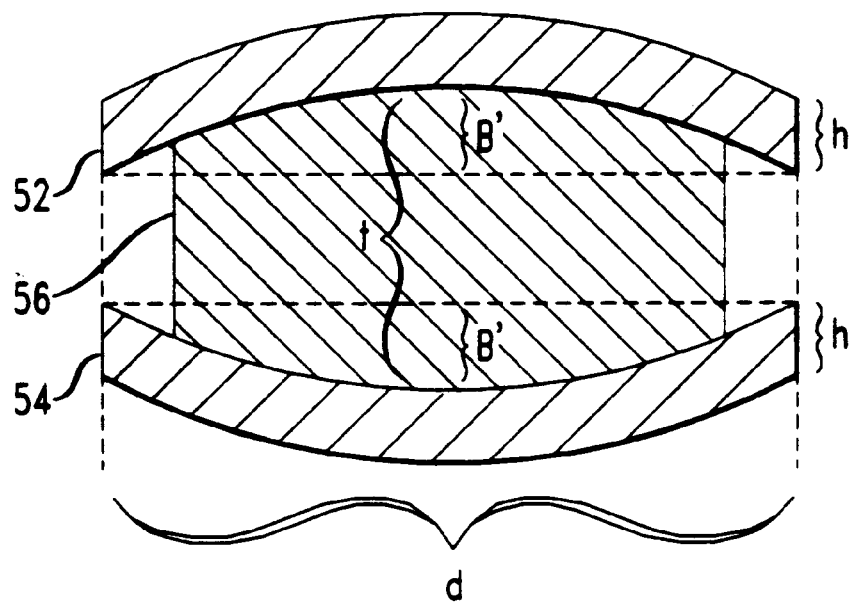

While not limiting the invention to any particular model or theory, it is believed that the force required for maintenance of the posture can be represented by the following simplistic model, for both a single substrate and for two substrates. See also L. D. Landau el al., *Theory of Elasticity*, Pergamon Press, Oxford, 3d English Ed., 1986, particularly page 44. For the equations below, the substrates are circular and initially have spherical bow, and the goal is to achieve a bow of zero. For a single substrate 50, as reflected in FIG. 7, the pressure difference across the substrate, P, necessary to produce compliance (i.e., reducing the bow to zero) is given by:

$$P = \left(\frac{256}{3}\right)\left(\frac{bh^3}{d^4}\right)\left(\frac{E}{(1-\sigma)(5+\sigma)}\right)$$

where:
h=substrate thickness
b=height of substrate bow in center
d=diameter of substrate
P1=air pressure on free surface of substrate
P2=air pressure on vacuum flat of substrate
P=P1·P2=pressure difference across substrate
σ=Poisson's ratio of substrate
E=Young's modules of substrate In the three-layer article of FIG. 8, there will exist a residual bow height, b', as the substrates 52, 54 (each having an initial bow height, b, as above) attempt to return to their original form and thereby push against the adherent layer 56. Additional parameters for this model are:
b'=residual bow height in three-layer article
t=bonding layer thickness (5>>b')
σ'=Poisson's ratio of adherent layer
E'=Young's modulus of adherent layer For this simplified model, the ratio of the final cell surface bow height to the cell diameter is given by:

$$\left(\frac{b'}{d}\right) = \left(\frac{128}{3}\right)\left(\frac{E}{E'}\right)\left(\frac{bh^3 t}{d^5}\right)\left(\frac{(1+\sigma')(1-2\sigma')}{(1-\sigma')(1-\sigma)(5+\sigma)}\right)$$

The adhesive strength between the adherent layer and the substrates thus needs to exceed the pressure differential P that is required to displace either substrate by an amount equal to (b-b'). For example, for b'<0.1 μm (approximately 0.2 wavelengths), d equal to 50 mm, t equal to 1 mm, E/E' equal to 2, σ equal to approximately 0.25, σ' equal to approximately zero, and h equal to 1 mm, the limit for initial substrate bow (2b/d) is less than ¼.

It is possible for the adherent to be photocurable or otherwise curable, e.g., heat or chemical curable. It is also possible for the adherent to be a material that undergoes a phase transformation, e.g., liquid to solid, to attain a required adherence. As used herein, the terms cure and curable are intended to encompass materials that gel or solidify by any such methods. Photocurable adherents include materials that cure upon exposure to any of a variety of wavelengths, including visible light, UV light, and x-rays. It is also possible to use adherents that are curable by electron or particle beams. Useful adherents include photocurable adherents that are photosensitive (referred to as photopolymers), the term photosensitive meaning a material that changes its physical and/or chemical characteristics in response to exposure to a light source (e.g., selective, localized exposure). Such photosensitive adherents include but are not limited to certain photosensitized acrylates and vinyl monomers. Photosensitive adherents are useful because they act as both an adherent and a recording media. Adherents such as those based on epoxides are also useful. One example of a useful photopolymer is a isobornyl acrylate-polytetrahydrofuran diurethane diacrylate matrix with n-vinylcarbazole dispersed therein (referred to herein as NVC). This photopolymer, as well as other suitable photopolymers, are discussed in co-assigned U.S. patent applications Ser. No. 08/698,511 pending (our reference Colvin 2-8-3-19-11-10) and Ser. No. 08/698,143 now U.S. Pat. No. 5,874,187 (our reference Colvin 1-2-16-10), the disclosures of which are hereby incorporated by reference.

It is possible for the adherent to comprise additives such as adherence-promoters, photoinitiators, absorptive materials, or polarizers. The thickness of the post-cure adherent will vary depending on several factors, including the adherent used, the method of application, the amount of adherent applied, and force exerted on the adherent by the substrates. Different thicknesses will be desired for different applications. The level of cure needed is determined by the particular adherent used and by the force required to maintain a substrate or multilayer article in the position imparted by the holder or holders. For material that are photocurable, heat curable, or chemically curable, it is possible for suitable cures to range from a few percent to 100%. For materials that undergo a complete phase transformation, e.g., liquid to solid, to attain the needed adherence, a complete phase transformation is considered to be a complete cure for the purposes of this application.

It is advantageous for the adherent to have, after the at least partial cure, a refractive index close to that of the substrate. Having a multilayer article with a near-uniform refractive index is advantageous because, as shown in the discussion of OPL above, a near-uniform refractive index through certain areas in an article will reduce the change in OPL in those areas. In other words, thickness variations in a substrate will not have a large effect on the ΔOPL if the adherent that fills or compensates for such variations has a refractive index close to the index of the substrate itself. For example, where two substrates each have a thickness variation of 5 waves/cm (i.e., total of 10 waves/cm), the refractive index is desirably within 1% (0.01) of the average of the refractive indices of the substrates in order to maintain a transmission flatness of 0.1 waves/cm. Where two substrates are used, the substrates advantageously have refractive indices that are equivalent to two decimal places, and the refractive index of the adherent is advantageously equivalent to two decimal places to the average of the refractive indices of the first and second substrates. In some applications, it is advantageous for the adherent to be of high optical quality, e.g., homogeneous, bubble-free, and low scattering.

The holders have a continuous surface portion on their inner surfaces to which the substrate or substrates substantially comply, as discussed above. The holders are advantageously vacuum chucks, meaning a flat surface in which the inner surfaces of the holders have one or more grooves, where a grasping forces is created by application of a vacuum to the substrate through the groove or grooves. Alternatively, the grasping steps are performed by use of electrostatic or magnetic attraction, or by temporary chemical bonding (e.g., adhesive). The grasping or temporary bonding force holds the substrate against the inner surface of the holder, attaining substantial compliance, particularly over the continuous surface portion of the inner surface, as discussed above. The required force will vary depending on the parameters of the particular substrates used, e.g., composition, thickness, initial flatness, flexibility. In an embodiment using two holders, the holders are arranged in any way that allows the attainment of the selected angular relationship, such as the arrangement given in the embodiment above.

It is advantageous in a two-holder configuration for at least one holder to be attached to a mechanism that allows the holder to move along its z-axis with very little resistance during the curing step. (The x- and y-axes define the plane on which the adherent is disposed, and the z-axis is the remaining axis.) For example, the holder could be attached to a piston mechanism that equalizes the downward pressure caused by the weight of the holder and substrate, thereby allowing the holder to almost float along the z-axis while remaining fixed in pitch and yaw. Providing such a mechanism is advantageous because some adherents will contract during curing, and, if both holders were immovably fixed during the cure, it is possible for such contraction to detrimentally affect both the adhesion between the adherent and the substrates and the angular relationship between the holders.

It is possible for the holders to be made from any material that maintains a flat surface and is able to apply a grasping force to the substrates or adequately maintain a temporary chemical bond. In the case of a photocurable adherent, as discussed above, the holders are advantageously glass or another material that allows enough light transmission to obtain an adequate cure, and allows use of a Fizeau or similar method to confirm parallelism of the holders are advantageous. In the case of adherents that do not require light to cure, it is possible to use non-transparent materials, but other methods for confirming the angular relationship of such materials must be used. The material selected for the holder also depends on the type of grasping force or temporary bond utilized, e.g., adhesive bond or magnetic attraction, and on the intended used of the multilayer article or substrate being fabricated.

The first and second substrates are of the same or different materials and are formed from ceramics (including glasses), metals, or plastics, depending on the intended use of the article or substrate being formed. Also, as discussed above in relation to the holders, it is possible for the substrates to be two pieces of a single part. The substrates are of any required shape. The substrates advantageously do not have flatness variations at such a high level that application of the grasping force could not attain substantial compliance with a holder surface without damaging the substrates. In addition to self-supporting substrates such as glass plates, it is possible for the substrates to be a polymeric material that is sprayed onto a holder, a thin polymer film such as Mylar®, or a polymer sheet such as polycarbonate. It is also possible for a polymeric material or film to be combined with a self-supporting material such as a glass plate to form a single substrate. The materials or films of such two-layer substrates may be photosensitive material, and the method of the invention is useful in improving the optical properties of such substrates.

It is important to design the Fizeau method to confirm parallelism and quality of the outer surfaces of the substrates. For example, it is advantageous to use plane wave illumination and wedged holders that are optically flat on both sides. In addition, antireflective (AR) coatings on substrates are advantageous for several reasons. Without an AR coating, no interface reflection exist between the substrate surface and the surface of the holder, making it difficult to utilize an interferometric method for determining the selected angular relationship. In addition, van der Waals and residual vacuum forces between the substrate and holder make separation of the substrate from the holder difficult, and antireflective coatings reduce such forces. Also, antireflective coatings enhance light throughput and reduce internal reflections within a multilayer substrate. Advantageously, only the side of the substrate that contacts the holder is given an AR coating. It is possible for AR coating on the side of a substrate on which the adherent is disposed to induce poor adhesion and/or cause unwanted additional reflections between the adherent and the substrate. In some configurations, however, other coatings, such as adhesion-promoters, are advantageously disposed on the side of the substrate on which the adherent is disposed. Such coatings are advantageously no thicker than 500 Angstroms.

In an embodiment of the invention using two substrates, it is possible to compensate for wedge type thickness variations, because the inner surfaces of the holders impart a selected angular relationship to the outer surfaces of the substrates, and wedge type variations in the substrates are translated to the interior of the article, where the adherent compensates for the variation while the angular relationship is maintained. The adherent similarly compensates for sharp or gradual wavy variations on the inner surfaces of the substrates by filling in such variations. It is possible to compensate for gradual, wavy variations on the side of the substrate on which no adherent has been disposed if (a) the method is performed such that at least some of the gradual wavy variations on the side of the substrate that complies with the holder are transmitted to the opposing side of the substrate, and (b) the adherent fills in or overlays the transmitted variations on that opposing side of the substrate. In addition, if the adherent in such a multilayer article has a post-cure refractive index close to the refractive index of the substrate, a near-uniform refractive index will be achieved in areas containing the adherent, and the change in optical path length across these areas of the article will therefore be reduced.

The method of the invention is useful for forming a variety of articles, particularly for use in optical systems, including high quality mirrors, flats, windows, prisms, beam splitters, filters, and lenses. In addition, it is possible to form memory cells for holographic data storage systems. Such cells are discussed, for example, in H. -Y. Li et al., "Three-dimensional holographic disks," *Appl. Opt.*, 33, pp. 3764–3774 (1994), and A. Pu et al., "A new method for holographic data storage in photopolymer films," Proceedings from IEEE/IEOS 1994 Symposium, pp. 433–435, the disclosures of which are hereby incorporated by reference. It is also possible for cells made according to the invention to be used for digital holographic storage, in which the cells currently must have a surface and transmission flatness of about 0.25 waves/cm or better and a bow of about $10^{-2}$ or less. Conventional methods of disposing photopolymers between substrates do not provide these needed properties, as reflected in Comparative Example 1 and 2 below.

In forming a holographic memory cell, two substrates are advantageously used, and both substrates are advantageously the same material. The substrates are advantageously selected from glass, sapphire, polycarbonate, and quartz. Any other material that is transparent to the wavelength being used in the holographic storage system, and which has adequate mechanical properties for a memory cell, may also be used as a substrate. The substrates are advantageously about 0.1 to about 1 mm thick. An initial substrate will typically have surface flatness and transmission flatness values of about 0.1 about 10 waves/cm, and a bow of about 0.1 or less. Commercially available display glass exhibits these properties, and is typically free from significant divots and peaks, meaning scratch and dig of 40/20 or better. Such display glass is suitable for fabrication of a memory cell.

As discussed above, having an adherent with a refractive index close to that of the substrates in advantageous because a near-uniform refractive index throughout a multilayer article will reduce variations in OPL. In fabricating a holographic memory cell for digital holography, it is advantageous for the refractive index of the firs substrate to be equivalent to two decimal places to the refractive index of the second substrate, and for the refractive index of the adherent to be equivalent to two decimal places to the average of the refractive indices of the first and second substrates.

It is also advantageous for the adherent in a holographic cell to be applied in a continuous layer, and for the adherent to be a photopolymer, i.e., capable of storing data in a holographic data storage system after a cure. Photopolymers such as those discussed above have been found to be useful adherents for holographic memory cells made according to the invention because these materials function both as adherents and as photosensitive recording media. After the cure, the thickness of the adherent in a memory cell is advantageously about 0.2 to about 2 mm. The post-cure memory cell advantageously has surface flatness and transmission flatness values of about 0.005 to about 0.25 waves/ cm, more advantageously, about 0.05 to about 0.1 waves/cm, and a bow of about $10^{-2}$ or less. The memory cell also advantageously has a Strehl value of about 0.9 or greater. As discussed above, these properties refer to the area of the multilayer article within the area of the continuous surface portions of the inner surfaces of the holders, and primarily where the adherent contacts the substrates. The areas of the substrates extending past the adherent-contact area typically will not exhibit these properties. This reflected in FIG. 9, which is a transmission flatness profile of a multilayer article useful as a digital holographic memory cell, made in accordance with Example 1. The uniform, circular area is where the continuous layer of adherent contacts the inner surfaces of the substrates, and is within the area defined by vacuum grooves in the holders. The outer area with a higher density of fringes has no photopolymer between the glass substrates, and the fringe density arises from the uncorrected transmission flatness of the two substrates.

A useful quality factor, or Q, for evaluating the properties of a memory cell made according to the method of the present invention is the Strehl value divided by the waves/ cm rms transmission flatness, as measured cover a predetermined area. In the Examples below, a 50 mm diameter circle is measured. Advantageously, memory cells made according to the method of the present invention have a Q greater than 1, and more advantageously, greater than 4. As a comparison, display glass typically has a Q of about 0.5, window glass a Q of about 0.005. In the absence of the inventions's steps of grasping substrates such that they substantially comply with at least the continuous surface portions of the inner surfaces of the holders, cells consisting of two substrates with adherent disposed in between would have a Q of about 0.08, primarily due to the initial Strehl of the glass, holder distortions, and shrinkage of the adherent.

The present invention further relates to a system, e.g., an optical system, containing a multilayer article that comprises one or two substrates and a layer of at least partially cured adherent adhered to the substrate or substrates, wherein the article has surface flatness and transmission flatness values of about 0.05 to about 0.25 waves/cm, preferably, 0.05 to about 0.1 waves/cm, and wherein the forces exerted by the adherent on the substrate or substrates maintain this flatness. In some applications, primarily with two substrates, the article also has a bow of about $10^{-2}$ or less (advantageously about $10^{-5}$ or less for reflective applications), and, in such applications, the force exerted by the adherent on the substrates maintains the bow as well. It is possible for the system to be a holographic storage system, in particular, a digital holographic data storage system. The elements of holographic storage systems are discussed, for example, in the articles cited above, as well as S. Pappu, "Holographic memories; a critical review," *Int. J. Optoelect.,* 5, pp. 251–292 (1990); L. Hesselink et al., "Optical memories implemented with photorefractive media," *Opt. Quant. Elect.,* 25, §§ 611–661 (1993); and D. Psaltis et al., "Holographic Memories," *Scientific American*, November 1995, the disclosures of which are hereby incorporated by reference. The parameters of the memory cell of the holographic data storage system are as discussed above.

The invention will be further clarified by the following examples, which are intended to be purely exemplary.

Example 1

A memory cell suitable for digital holographic data storage systems was made according to the following steps. Two 10 cm diameter, about 1.9 cm thick glass flats having a surface flatness of 0.005 waves/cm were obtained, and into each was carved a circular vacuum-accessible groove about 3.2 mm wide by about 1.6 mm deep, the groove having an inner diameter of about 6.4 cm. The holders were cleaned by a drop and drag method using acetone and then methanol. Square glass substrates of display glass, having an antireflective coating on one side, measuring 75 mm by 75 mm by about 1.11 mm, and having surface flatness and transmission flatness values of about 1 wave/cm, were similarly cleaned. The holders were mounted into an apparatus such that they were located one over the other, and their vacuum grooves were attached to a house vacuum at approximately 0.1 atmosphere. The holders were arranged such that the bottom holder could be rotated in pitch and yaw, but did not move along the z-axis, whereas the top holder was fixed in pitch and yaw but moved vertically along the z-axis. To measure the parallelism of the holders, an expanded, collimated HeNe laser beam was directed at the central portion of the holders from above, at a slight angle. The reflection from the two inner surfaces of the holders when the holders were brought nearly into contact indicated the degree of parallelism of the holders. The bottom holder was adjusted until the interference reflection showed a bulls-eye pattern, which indicated a parallel relationship to within 0.05 waves/cm.

Once the parallelism was established, the top holder was moved up, the vacuum pump was started, and the substrates were placed onto the inner surfaces of the holders such that the side of the substrates having the antireflective coating contacted the holders. The force of the vacuum (approximately 0.1 atmosphere) caused substantial compliance of the substrates with the surface of the holders, primarily over the area surrounded by and including the vacuum grooves. About 0.4 mL of an adherent consisting of NVC was introduced on the inner surface of the bottom substrate with a syringe and hypodermic needle until the NVC formed a small pool of liquid. (The amount of adherent liquid required to form a 65 mm diameter pool is approximately 1 mL per 250 $\mu$m of layer thickness.) The upper substrate was brought down into contact with the adherent, and the force between the substrates caused the adherent to spread across the inner surfaces of the substrates in a circular pattern.

The polymer layer thickness was adjusted to about 100 $\mu$m, and parallelism was confirmed with the Fizeau method. The cell was illuminated from above with a uniform intensity (35 mW/cm$^2$ @ 546 nm) mercury line lamp, through a diffuser, for 120 seconds to cure the NVC layer approximately 90%. The vacuum was then released and the multilayer cell removed.

Figure 9:
FIGS. 9 and 10 show the flatness profiles of three-layer articles made in accordance with the invention.

The area of the finished cell where the adherent contacted the substrates, which was within the continuous surface portion defined by the vacuum grooves of the holders, had an rms surface and transmission flatness values of better than 0.1 waves/cm, a Strehl value of 0.974, and a bow of less than $10^{-4}$, for a Q of about 10. These parameters were measured by a Zygo® Fizeau interferometer. FIG. 9 shows the transmission flatness profile for this cell, as generated by the same device. Each grouping of dark/bright/dark or bright/dark/bright fringes is equivalent to one half wavelength. The profile clearly shows an excellent flatness uniformity in the area where the adherent contacts the substrates within the circle defined by the vacuum groove, with variations outside this contact area.

Example 2

Figure 10:

A second memory cell was made according to the same procedures as Example 1. The area of the finished cell where the adherent contacted the substrates had an rms surface and transmission flatness of about 0.065 waves/cm, a Strehl value of greater than 0.98, and a bow of less than $10^{-4}$, for a Q of about 15. The flatness transmission profile is shown in FIG. 10, and was obtained in the same manner as in Example 1. Again, the area at the adherent shows excellent properties.

Comparative Example 1

Figure 11:
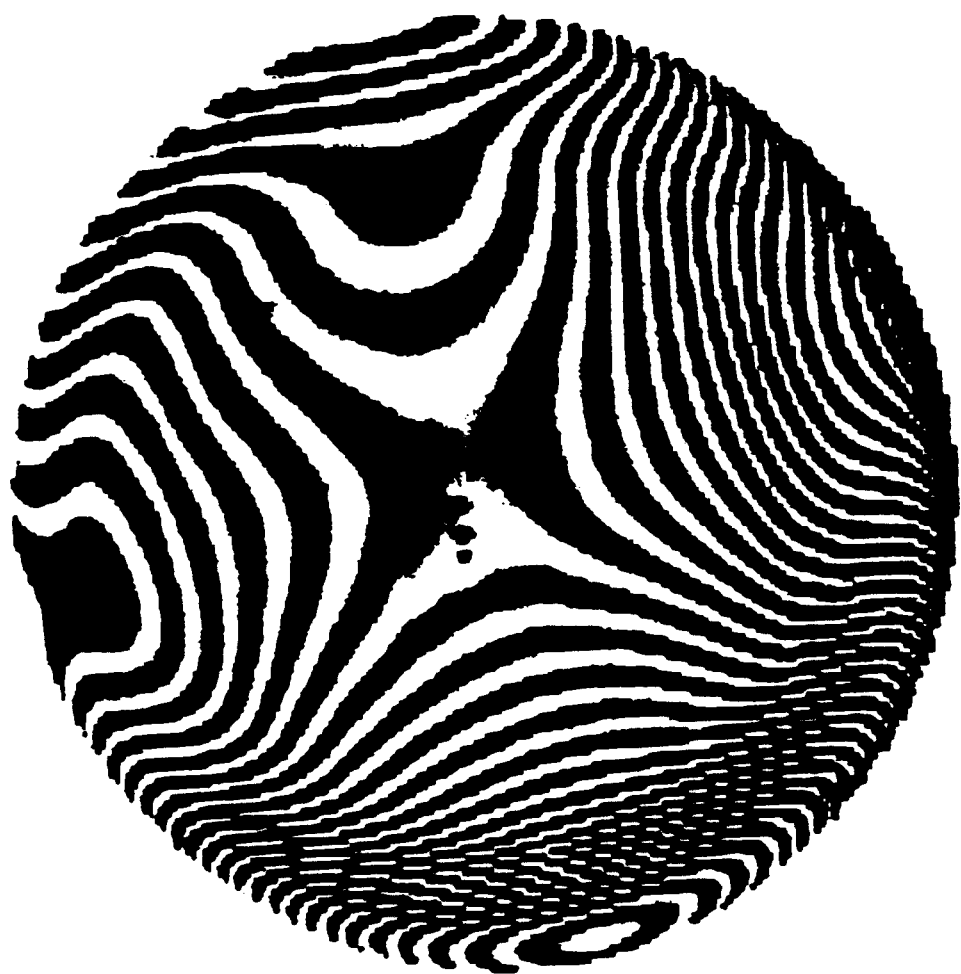
FIGS. 11 and 12 show the flatness profiles of three-layer articles made by conventional methods.

In this comparative experiment, conventional circular vacuum rings made of turned aluminum were used, the rings having a thickness of about 1 cm and a vacuum groove about 100 μm×100 μm. The rings had a flatness of about 5 waves/cm, but did not have the continuous surface portions of the holders of the invention. Two substrates of the same types as in the above Examples were used. In the same manner as Examples 1 and 2, the parallelism of the substrates was established after placing the substrates onto the vacuum rings at the same vacuum strength as above. The NVC adherent used above was disposed on a lower substrate, the upper substrate was moved into contact with the adherent to provide an adherent layer of about 300 μm, and the adherent was cured, all in the same manner as Examples 1 and 2. The adherent layer was adjusted to the thickness of about prior to the cure. The transmission flatness profile, taken as in Examples 1, is shown in FIG. 11. The profile reflects numerous flatness fluctuations in the area where the adherent is located. The Strehl value of the multilayer article was 0.024.

Comparative Example 2

Figure 12:

This comparative experiment used two substrates of the same display glass as in the above Examples. The same NVC adherent used in the above Examples was disposed onto the center portion of a lower substrate, in the same manner as above. Two approximately 300 μm-thick Mylar spacers, having a width of about 10 mm and a length of about 75 mm, were placed along the edges of the lower substrate, and the upper substrate was place on top of the spacers. The substrates were clamped together over the area of the spacers, the clamps extending from the substrate edges about 10 mm toward the center of the substrates. The adherent layer was the same thickness as the spacers—about 300 μm. The adherent was then cured as in the above Examples. FIG. 12 is the transmission flatness profile, taken in the same manner as above, and shows the poor results obtained with this method. The Strehl value of the multilayer article was 0.032.

Example 3

Figure 13:
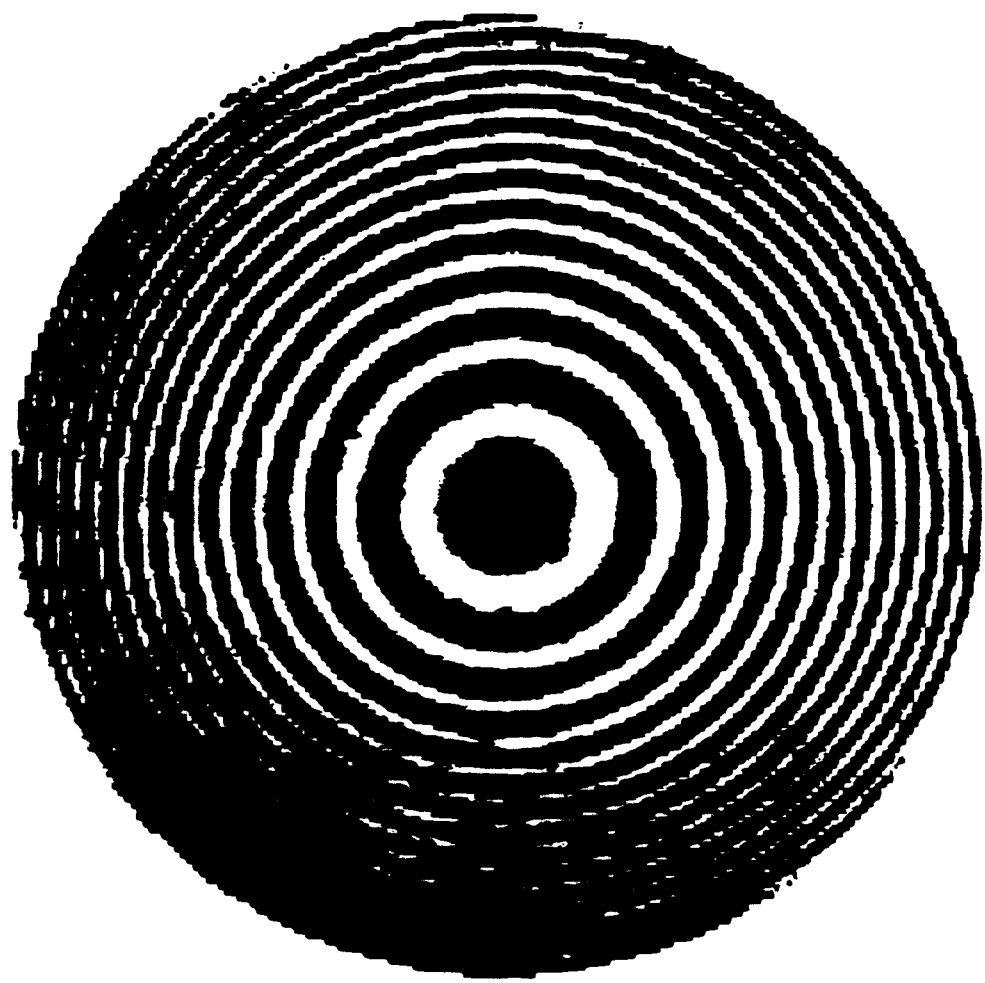
FIG. 13 shows a flatness profile of a two-layer article made in accordance with the invention.

One substrate of the type used above was placed onto a single holder of the type used in Examples 1 and 2. A circular layer of the NVC adherent about 1 mm thick and about 75 mm in diameter was disposed onto the substrate in the same manner as above, and the layer was cured as above. Upon removal from the holder, the substrate maintained the surface flatness imparted by the holder, but shrinkage of the adherent induced stresses that resulted in a parabolic bow. FIG. 13, a flatness profile taken by the same apparatus as the above Examples, except in the reflective mode, shows the excellent parabolic properties of the resultant two-layer article in the area of the adherent.

Other embodiments of the invention will be apparent to those skilled in the art from consideration of the specification and practice of the invention disclosed herein.

What is claimed is:

1. A system comprising a multilayer article the comprises a first substrate, a second substrate, and a layer of at least partially cured adherent adhered to the first and the second substrates, wherein the article has a surface flatness of about 0.05 to about 0.25 waves/cm and a transmission flatness of about 0.05 to about 0.25 waves/cm for wavelengths of about 0.4 to about 0.7 μm, and wherein the force exerted by the adherent on the first and the second substrates maintains the surface and transmission flatness.

2. The system of claim 1 wherein the multilayer article has a bow of about $10^{-2}$ or less, and wherein the adherent maintains the bow.

3. The system of claim 2, wherein the multilayer article has a Strehl value of 0.9 or greater.

4. The system of claim 1, wherein the first and second substrates are the same or different and are selected from glass, sapphire, polycarbonate, and quartz.

5. The system of claim 1, wherein the adherent comprises a photopolymer.

6. The system of claim 1, wherein the refractive index of he first substrate is equivalent to two decimal places to the refractive index of the second substrate, and wherein the refractive index of the at least partially cured adherent is equivalent to within two decimal places of the average of the refractive indices of the first and second substrates.

7. The system of claim 1, wherein the system is a holographic storage system and the multilayer article is a holographic memory cell.

8. The system of claim 7, wherein the system is a digital holographic storage system.

9. The system of claim 8, wherein the Strehl/rms ratio of the holographic memory cell is about 1 or greater.

* * * * *